(12) United States Patent
Yokoyama et al.

(10) Patent No.: US 10,165,548 B2
(45) Date of Patent: Dec. 25, 2018

(54) ELECTRONIC APPARATUS, WIRELESS COMMUNICATION METHOD, AND COMPUTER-READABLE RECORDING MEDIUM

(71) Applicant: SEIKO EPSON CORPORATION, Tokyo (JP)

(72) Inventors: Daiki Yokoyama, Nagano (JP); Kenji Sakuda, Nagano (JP); Kota Nishida, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/271,365

(22) Filed: Sep. 21, 2016

(65) Prior Publication Data

US 2017/0156172 A1 Jun. 1, 2017

(30) Foreign Application Priority Data

Nov. 27, 2015 (JP) .................................. 2015-232275

(51) Int. Cl.
| | |
|---|---|
| *H04W 68/12* | (2009.01) |
| *H04W 4/80* | (2018.01) |
| *H04W 76/14* | (2018.01) |
| *H04W 76/15* | (2018.01) |
| *H04W 84/12* | (2009.01) |
| *H04W 88/08* | (2009.01) |

(52) U.S. Cl.
CPC ............. *H04W 68/12* (2013.01); *H04W 4/80* (2018.02); *H04W 76/14* (2018.02); *H04W 76/15* (2018.02); *H04W 84/12* (2013.01); *H04W 88/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,043,205 | B1 * | 5/2006 | Caddes | H04W 76/023 |
| | | | | 455/41.2 |
| 8,595,365 | B2 * | 11/2013 | Scott | H04W 48/18 |
| | | | | 370/338 |
| 9,088,961 | B1 * | 7/2015 | Davis | H04W 76/00 |
| 2002/0160765 | A1 * | 10/2002 | Okajima | H04B 1/406 |
| | | | | 455/419 |

(Continued)

FOREIGN PATENT DOCUMENTS

JP 2014-197741 A 10/2014

*Primary Examiner* — Cindy Trandai

(57) ABSTRACT

An electronic apparatus includes: a short-distance wireless communication unit; a wireless communication unit that provides wireless communication for multiple different connection types; an acquisition unit that acquires connection type information relating to a connection type that is provided by an external apparatus, from the external apparatus through the short-distance wireless communication unit; a determination unit that determines a recommendation connection type that is used for the communication between the external apparatus and the wireless communication unit, based on connection type information on the external apparatus, and connection type information relating to a connection type that is provided by the wireless communication unit; and a notification unit that notifies a user of the recommendation connection type.

25 Claims, 11 Drawing Sheets

(56) References Cited

U.S. PATENT DOCUMENTS

| | | | |
|---|---|---|---|
| 2003/0035006 A1* | 2/2003 | Kodosky | G05B 19/0426 715/763 |
| 2007/0066304 A1* | 3/2007 | Lee | H04W 48/20 455/436 |
| 2008/0021991 A1* | 1/2008 | Kawai | H04L 41/00 709/223 |
| 2008/0240401 A1* | 10/2008 | Mergen | H04M 3/42136 379/243 |
| 2009/0082011 A1* | 3/2009 | Zhang | H04M 1/72572 455/426.1 |
| 2011/0211540 A1* | 9/2011 | Leinonen | H04W 48/16 370/329 |
| 2013/0174237 A1* | 7/2013 | Zises | G06F 21/32 726/7 |
| 2014/0009786 A1* | 1/2014 | Sako | G06F 3/1292 358/1.15 |
| 2014/0115058 A1* | 4/2014 | Yin | H04W 76/023 709/204 |
| 2014/0168681 A1* | 6/2014 | Nakamura | G06F 3/1276 358/1.13 |
| 2014/0256256 A1* | 9/2014 | Park | H04W 36/14 455/41.1 |
| 2014/0295766 A1 | 10/2014 | Matsumoto et al. | |
| 2015/0002890 A1* | 1/2015 | Okuno | G06F 3/1294 358/1.15 |
| 2015/0201330 A1* | 7/2015 | Iko | H04W 12/08 380/270 |
| 2015/0237490 A1* | 8/2015 | Chang | H04W 4/26 455/406 |
| 2015/0237493 A1* | 8/2015 | Won | G06F 3/04817 715/734 |
| 2016/0065667 A1* | 3/2016 | Aoki | H04W 8/005 709/219 |
| 2016/0119387 A1* | 4/2016 | Vendrow | H04L 65/1096 370/261 |
| 2016/0142581 A1* | 5/2016 | Morita | H04W 4/80 358/1.13 |
| 2016/0212578 A1* | 7/2016 | Tong | H04W 76/14 |
| 2016/0217617 A1* | 7/2016 | Barribeau | G06F 3/04815 |
| 2016/0381722 A1* | 12/2016 | Konji | H04W 76/021 370/329 |
| 2017/0134609 A1* | 5/2017 | Park | H04N 1/32776 |

* cited by examiner

| CURRENT CONNECTION TYPE FOR TERMINAL \ CURRENT CONNECTION TYPE FOR PRINTER | UNCONNECTED | Wi-Fi (11ac) | Wi-Fi (11b/g/n) | Wi-Fi (11b/g) | Wi-Fi (11b) | DIRECT (AVAILABLE) | DIRECT (UNAVAILABLE) |
|---|---|---|---|---|---|---|---|
| UNCONNECTED | | DIRECT | DIRECT | DIRECT | DIRECT | DIRECT | UNAVAILABLE |
| Wi-Fi (11ac) | Wi-Fi (11ac) | Wi-Fi (11ac) | Wi-Fi (11ac) | Wi-Fi (11ac) | Wi-Fi (11ac) | Wi-Fi (11ac) | Wi-Fi (11ac) |
| Wi-Fi (11b/g/n) | DIRECT | DIRECT | DIRECT | DIRECT | DIRECT | DIRECT | Wi-Fi (11b/g/n) |
| Wi-Fi (11b/g) | DIRECT | DIRECT | DIRECT | DIRECT | DIRECT | DIRECT | Wi-Fi (11b/g) |
| Wi-Fi (11b) | DIRECT | DIRECT | DIRECT | DIRECT | DIRECT | DIRECT | Wi-Fi (11b) |
| DIRECT | DIRECT | DIRECT | DIRECT | DIRECT | DIRECT | DIRECT | UNAVAILABLE |

* ONLY 11g/n IS AVAILABLE FOR DIRECT

| CURRENT CONNECTION TYPE FOR TERMINAL \ CURRENT CONNECTION TYPE FOR PRINTER | Wi-Fi (11ac) +DIRECT (AVAILABLE) | Wi-Fi (11b/g/n) +DIRECT (AVAILABLE) | Wi-Fi (11b/g) +DIRECT (AVAILABLE) | Wi-Fi (11b) +DIRECT (AVAILABLE) | Wi-Fi (11ac) +DIRECT (UNAVAILABLE) | Wi-Fi (11b/g/n) +DIRECT (UNAVAILABLE) | Wi-Fi (11b/g) +DIRECT (UNAVAILABLE) | Wi-Fi (11b) +DIRECT (UNAVAILABLE) |
|---|---|---|---|---|---|---|---|---|
| UNCONNECTED | Wi-Fi (11ac) | DIRECT | DIRECT | DIRECT | Wi-Fi (11ac) | Wi-Fi (11b/g/n) | Wi-Fi (11b/g) | Wi-Fi (11b) |
| Wi-Fi (11ac) | Wi-Fi (11ac) | Wi-Fi (11ac) | Wi-Fi (11ac) | Wi-Fi (11ac) | Wi-Fi (11ac) | Wi-Fi (11b/g) | Wi-Fi (11b/g) | Wi-Fi (11b) |
| Wi-Fi (11b/g/n) | Wi-Fi (11ac) | DIRECT | DIRECT | DIRECT | Wi-Fi (11ac) | Wi-Fi (11b/g/n) | Wi-Fi (11b/g/n) | Wi-Fi (11b/g/n) |
| Wi-Fi (11b/g) | Wi-Fi (11ac) | DIRECT | DIRECT | DIRECT | Wi-Fi (11ac) | Wi-Fi (11b/g) | Wi-Fi (11b/g) | Wi-Fi (11b/g) |
| Wi-Fi (11b) | Wi-Fi (11ac) | DIRECT | DIRECT | DIRECT | Wi-Fi (11ac) | Wi-Fi (11b) | Wi-Fi (11b) | Wi-Fi (11b) |
| DIRECT | Wi-Fi (11ac) | DIRECT | DIRECT | DIRECT | Wi-Fi (11ac) | Wi-Fi (11b/g) | Wi-Fi (11b/g) | Wi-Fi (11b) |

152   153   151

* ONLY 11g/n IS AVAILABLE FOR DIRECT

| CURRENT CONNECTION TYPE FOR TERMINAL \ CURRENT CONNECTION TYPE FOR PRINTER | UNCONNECTED | Wi-Fi (NO SECURITY) | Wi-Fi (WEP) | Wi-Fi (TKIP) | Wi-Fi (AES) | DIRECT (AVAILABLE) | DIRECT (UNAVAILABLE) |
|---|---|---|---|---|---|---|---|
| UNCONNECTED | | DIRECT | DIRECT | DIRECT | Wi-Fi (AES) | DIRECT | UNAVAILABLE |
| Wi-Fi (NO SECURITY) | DIRECT | DIRECT | DIRECT | DIRECT | Wi-Fi (AES) | DIRECT | UNAVAILABLE |
| Wi-Fi (WEP) | DIRECT | DIRECT | DIRECT | DIRECT | Wi-Fi (AES) | DIRECT | Wi-Fi (WEP) |
| Wi-Fi (TKIP) | DIRECT | DIRECT | DIRECT | DIRECT | Wi-Fi (AES) | DIRECT | Wi-Fi (TKIP) |
| Wi-Fi (AES) | Wi-Fi (AES) | Wi-Fi (AES) | Wi-Fi (AES) | Wi-Fi (AES) | Wi-Fi (AES) | Wi-Fi (AES) | Wi-Fi (AES) |
| DIRECT | DIRECT | DIRECT | DIRECT | DIRECT | Wi-Fi (AES) | DIRECT | UNAVAILABLE |

* ONLY TKIP IS AVAILABLE FOR DIRECT

FIG. 6

| CURRENT CONNECTION TYPE FOR TERMINAL \ CURRENT CONNECTION TYPE FOR PRINTER | Wi-Fi (NO SECURITY) + DIRECT (AVAILABLE) | Wi-Fi (WEP) + DIRECT (AVAILABLE) | Wi-Fi (TKIP) + DIRECT (AVAILABLE) | Wi-Fi (AES) + DIRECT (AVAILABLE) | Wi-Fi (NO SECURITY) + DIRECT (UNAVAILABLE) | Wi-Fi (WEP) + DIRECT (UNAVAILABLE) | Wi-Fi (TKIP) + DIRECT (UNAVAILABLE) | Wi-Fi (AES) + DIRECT (UNAVAILABLE) |
|---|---|---|---|---|---|---|---|---|
| UNCONNECTED | DIRECT | DIRECT | DIRECT | Wi-Fi (AES) | UNAVAILABLE | Wi-Fi (WEP) | Wi-Fi (TKIP) | Wi-Fi (AES) |
| Wi-Fi (NO SECURITY) | DIRECT | DIRECT | DIRECT | Wi-Fi (AES) | UNAVAILABLE | Wi-Fi (WEP) | Wi-Fi (TKIP) | Wi-Fi (AES) |
| Wi-Fi (WEP) | DIRECT | DIRECT | DIRECT | Wi-Fi (AES) | Wi-Fi (WEP) | Wi-Fi (WEP) | Wi-Fi (TKIP) | Wi-Fi (AES) |
| Wi-Fi (TKIP) | DIRECT | Wi-Fi (AES) | Wi-Fi (AES) | Wi-Fi (AES) | Wi-Fi (TKIP) | Wi-Fi (TKIP) | Wi-Fi (TKIP) | Wi-Fi (AES) |
| Wi-Fi (AES) | DIRECT | DIRECT | Wi-Fi (AES) | Wi-Fi (AES) | Wi-Fi (AES) | Wi-Fi (AES) | Wi-Fi (AES) | Wi-Fi (AES) |
| DIRECT | DIRECT | DIRECT | DIRECT | Wi-Fi (AES) | UNAVAILABLE | Wi-Fi (WEP) | Wi-Fi (TKIP) | Wi-Fi (AES) |

* ONLY TKIP IS AVAILABLE FOR DIRECT

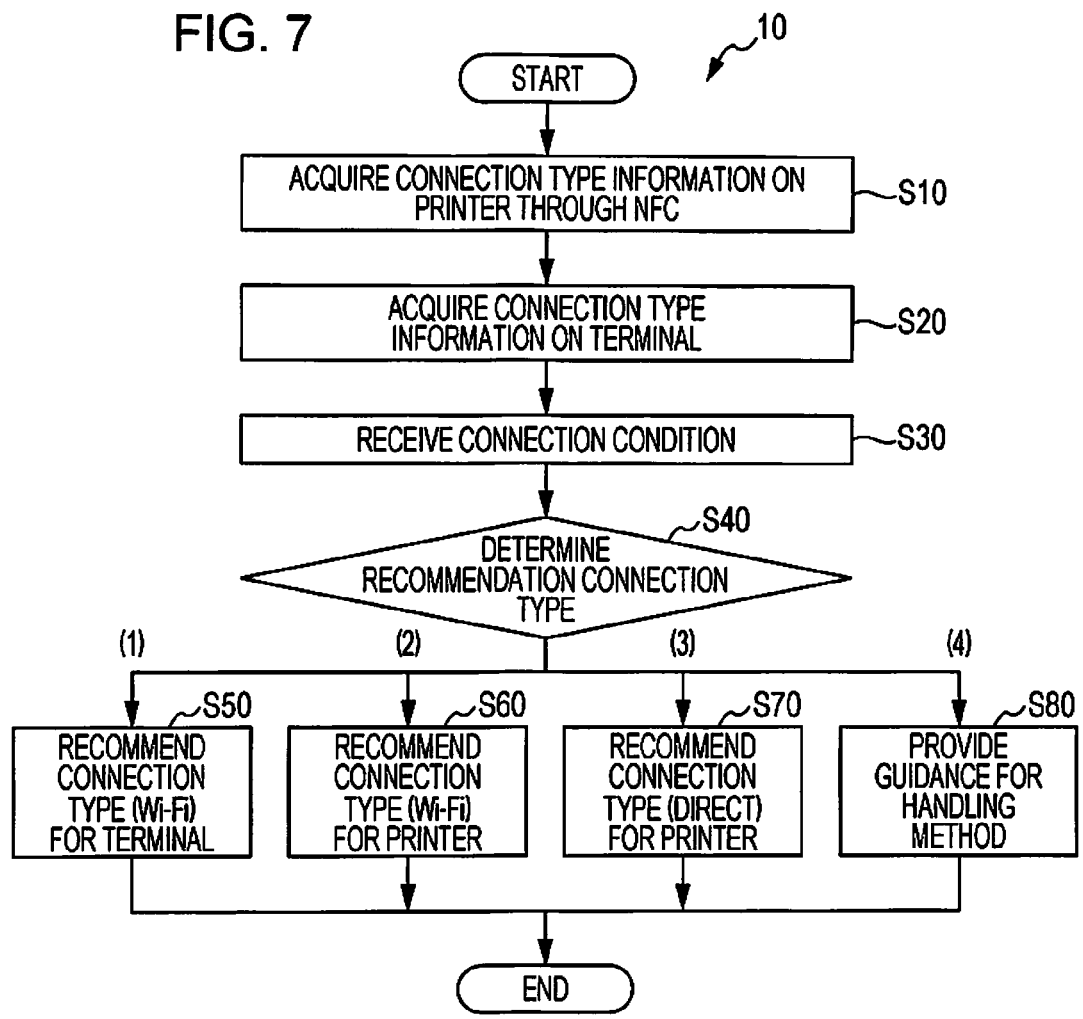
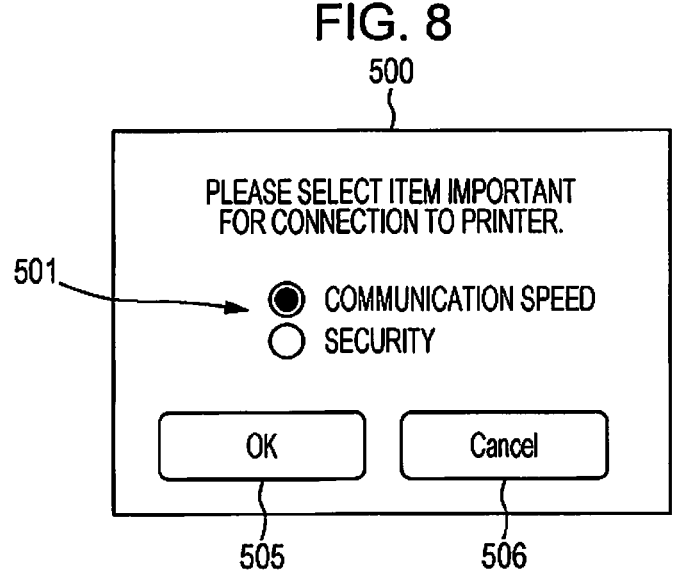

ELECTRONIC APPARATUS, WIRELESS COMMUNICATION METHOD, AND COMPUTER-READABLE RECORDING MEDIUM

CROSS REFERENCES TO RELATED APPLICATIONS

This application claims priority to Japanese Application No. 2015-232275, filed Nov. 27, 2015, the entirety of which is incorporated by reference herein.

BACKGROUND

1. Technical Field

The present invention relates to an electronic apparatus, a wireless communication method, and a computer-readable recording medium.

2. Related Art

JP-A-2014-197741 discloses a smartphone in which, according to a selection condition in which communication expense or a service is preferentially designated, a communication path that is used for communication with a multi-functional printer is selected from among multiple communication paths.

For recent printers, various connection types are available as connection types that use a wireless LAN. The connection type, for example, includes a Wi-Fi connection (an infrastructure mode) in which a printer communicates with an external apparatus through an access point (AP), a direct connection (Wi-Fi Direct mode) in which the printer communicates with one external apparatus in a peer-to-peer manner, a direct model (a soft AP mode) in which the printer as the AP communicates with each of the multiple external apparatuses in a peer-to-peer manner, and the like. Furthermore, for the Wi-Fi connection, there are multiple specifications (IEEE 802.11a, b, g, n, ac, and the like) that differ in communication speed.

Without any help, it is difficult for a user to select a suitable connection type from among multiple connection types as described above, and to establish a communication connection. In the smartphone in JP-A-2014-197741, the communication path is selected according to the selection condition in which the communication expense and the service is preferentially designated. However, in the smartphone, a suitable connection type cannot be selected from among various connection types for the wireless LAN.

SUMMARY

An advantage of some aspects of the invention is that support is provided in such a manner that selection of a connection type for wireless communication is easily performed.

According to an aspect of the invention, there is provided an electronic apparatus including: a short-distance wireless communication unit; a wireless communication unit that provides wireless communication for multiple different connection types; an acquisition unit that acquires connection type information relating to a connection type that is provided by an external apparatus, from the external apparatus through the short-distance wireless communication unit; a determination unit that determines a recommendation connection type that is used for the communication between the external apparatus and the wireless communication unit, based on connection type information on the external apparatus, and connection type information relating to a connection type that is provided by the wireless communication unit; and a notification unit that notifies a user of the recommendation connection type. Accordingly, the electronic apparatus can make it possible for a user to easily select a suitable connection type for the wireless communication.

In the electronic apparatus, the connection type information on the external apparatus may include information relating to a currently available connection type for the external apparatus, and the connection type information on the wireless communication unit may include information relating to a currently available connection type for the wireless communication unit. Accordingly, the electronic apparatus can make it possible for the user to easily select the suitable connection type for the wireless communication from among currently available connection types.

In the electronic apparatus, the determination unit may determine one of the connection type for the external apparatus and the connection type for the wireless communication unit that has higher performance in a prescribed attribute item than the other, as the recommendation connection type. Accordingly, the electronic apparatus makes it possible for the user to select a connection type that has high performance in a prescribed attribute item, as the suitable connection type.

In the electronic apparatus, the connection type information on the external apparatus may include pieces of information relating to a first connection type and a second connection type that are provided by the external apparatus, and the determination unit may select one that has higher performance in the attribute item, from among the first connection type and the connection type for the wireless communication unit. Furthermore, in a case where the performance in the attribute item for high-performance connection type is the same as or lower than performance in the attribute item for the second connection type, the determination unit may determine the second connection type as the recommendation connection type. Furthermore, in a case where the performance in the attribute item for the high-performance connection type is higher than the performance in the attribute item for the second connection type, the determination unit may determine the selected connection type as the recommendation connection type. Accordingly, the electronic apparatus makes it possible for the user to select a connection type that has higher performance in the attribute item.

In the electronic apparatus, the connection type information on the external apparatus may include information indicating whether or not the second connection type is available for communication connection. Furthermore, in a case where the performance in the attribute item for the high-performance connection type is the same as or lower than the performance in the attribute item for the second connection type, the determination unit may determine the second connection type as the recommendation connection type if the second connection type is available for the communication connection, and may determine the selected connection type as the recommendation connection type if the second connection type is not available for the communication connection. Accordingly, the electronic apparatus can prevent the connection type unavailable for communication connection from being recommended.

In the electronic apparatus, the first connection type may be a connection type that performs communication through an access point, the second connection type may be a connection type that performs the communication in a peer-to-peer manner, and the connection type for the wireless communication unit may be the connection type that performs the communication through the access point or be the connection type that performs the communication in a peer-to-peer manner. Accordingly, the electronic apparatus can recommend not only the access point-involved connection type, but also the peer-to-peer connection type.

In the electronic apparatus, the prescribed attribute item may be communication speed or security, the user may notify the acquisition unit which of the communication and the security is selected, and the determination unit may determine one of the connection type for the external apparatus and the connection type for the wireless communication type that has higher performance in the selected attributed item than the other, as the recommendation connection type. Accordingly, the electronic apparatus can recommend the connection type as well, based on a condition that is desired by the user.

In the electronic apparatus, the connection type information on the external apparatus may include configuration information on the connection type for the external apparatus, and in a case where the connection type for the external apparatus is determined as the recommendation connection type, the electronic apparatus may include a connection processing unit that performs connection processing for communication with the external apparatus using the determined connection type, based on the configuration information. Accordingly, the user can simply establish the communication connection using a suitable connection type.

In the electronic apparatus, the connection type information on the external apparatus may include configuration information on the connection type for the external apparatus, and in a case where the connection type for the external apparatus is determined as the recommendation connection type, the notification unit may output the configuration information. Accordingly, the user can simply configure the configuration information on the suitable connection type for the electronic apparatus, and thus can establish the communication connection.

In the electronic apparatus, the connection type information on the wireless communication unit may include configuration information on the connection type for the wireless communication unit, and in a case where the connection type for the wireless communication unit is determined as the recommendation connection type, the notification unit may output the configuration information. Accordingly, the user can simply configure the configuration information on the suitable connection type for the external apparatus, and thus can establish the communication connection.

According to another aspect of the invention, there is provided a wireless communication method for use in an electronic apparatus including a short-distance wireless communication unit and a wireless communication unit that provides wireless communication for multiple different connection types, the method including: acquiring connection type information relating to a connection type that is provided by an external apparatus, from the external apparatus through the short-distance wireless communication unit; determining a recommendation connection type that is used for the communication between the external apparatus and the wireless communication unit, based on connection type information on the external apparatus, and connection type information relating to a connection type that is provided by the wireless communication unit; and notifying a user of the recommendation connection type. Accordingly, the electronic apparatus can make it possible for the user to easily select the suitable connection type for the wireless communication.

According to still another aspect of the invention, there is provided a program that runs on an electronic apparatus including a short-distance wireless communication unit and a wireless communication unit that provides wireless communication for multiple different connection types, the program causing the electronic apparatus to perform: acquiring connection type information relating to a connection type that is provided by an external apparatus, from the external apparatus through the short-distance wireless communication unit; determining a recommendation connection type that is used for the communication between the external apparatus and the wireless communication unit, based on connection type information on the external apparatus, and connection type information relating to a connection type that is provided by the wireless communication unit; and notifying the user of the recommendation connection type. Accordingly, the electronic apparatus can make it possible for the user to easily select the suitable connection type for the wireless communication.

BRIEF DESCRIPTION OF THE DRAWINGS

The invention will be described with reference to the accompanying drawings, wherein like numbers reference like elements.

FIG. 3 is a diagram (a first one) illustrating one example of a recommendation determination table that is based on a communication speed.

FIG. 4 is a diagram (a second one) illustrating one example of the recommendation determination table that is based on the communication speed.

FIG. 5 is a diagram (a first one) illustrating one example of a recommendation determination table that is based on the security.

FIG. 6 is a diagram (a second one) illustrating one example of the recommendation determination table that is based on the security.

FIG. 7 is a flowchart illustrating one example of recommendation determination processing by a terminal.

FIG. 8 is a diagram illustrating one example of an operation screen.

DESCRIPTION OF EXEMPLARY EMBODIMENTS

One embodiment of the invention is described referring to the accompanying drawings.

Figure 1:
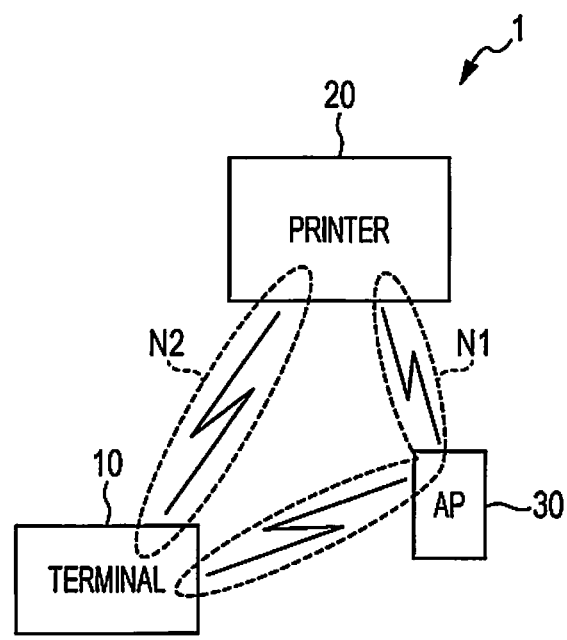
FIG. 1 is a constitutional diagram illustrating an example of a constitution of a wireless communication system according to one embodiment of the invention.

FIG. 1 is a constitutional diagram illustrating an example of a constitution of a wireless communication system. A wireless communication system 1 includes one or more terminals 10 (which is equivalent to an "electronic apparatus" or an "external apparatus" according to the invention) and one printer 20 (which is equivalent to the "external apparatus" or the "external apparatus" according to the invention). The terminals 10, for example, include a smartphone, a Personal Computer (PC), and the like. The terminal 10 and the printer 20 make connections to each other over a wireless Local Area Network (LAN), and can perform communication.

For easy-to-understand description, a wireless LAN according to the present embodiment uses the following two connection types.

(N1) Wi-Fi connection (an infrastructure mode) (which is hereinafter referred to as "Wi-Fi connection") in which the terminal 10 and the printer 20 communicates with each other through an Access Point (AP) 30.

(N2) Direct connection (a soft AP mode) (which is hereinafter referred to a "direct connection") in which the printer 20 and each of the one or more terminals 10 communicates with each other in a peer-to-peer manner through an AP that is included in the printer 20.

Furthermore, the Wi-Fi connections (N1) according to the present embodiment, when categorized by a communication speed, include the following multiple connection types in decreasing order of speed.

IEEE 802.11ac
IEEE 802.11b/g/n (IEEE 802.11n)
IEEE 802.11b/g (IEEE802.11g)
IEEE 802.11b (The level is raised going from left to right. The level raising order is 11n, 11g, 11b. A high-level specification has backward compatibility with a low-level specification).

Furthermore, the direct connections (N2) according to the present embodiment, when categorized by the communication speed, include the following one connection type.

IEEE 802.11g/n (IEEE 802.11n)

Furthermore, the Wi-Fi connections (N1) according to the present embodiment, when categorized by an encryption scheme, include the following multiple connection types in increasing order of security.

No Security
Wired Equivalent Privacy (WEP)
Temporal Key Integrity Protocol (TKIP)
Advanced Encryption Standard (AES)

Furthermore, the direct connections (N2) according to the present embodiment, when categorized by the encryption scheme, include the following one connection type.

Temporal Key Integrity Protocol (TKIP)

The terminal 10 can make a wireless connection to the printer 20 for communication, using the connection type, that is, any one of the multiple Wi-Fi connections (a possible combination of the communication speed and the encryption scheme) or the direct connection. The printer 20 can make a wireless connection to each terminal 10 for communication, using the connection type, that is, any one of the multiple Wi-Fi connections or the direct connection. The printer 20 may establish both of any one of the multiple Wi-Fi connections and the direct connection at the same time. That is, while communicating with a certain terminal 10 through the Wi-Fi connection, the printer 20 may communicate with a different terminal 10 through the direct connection. With the direct connection, the printer 20 can establish communication connections up to and including prescribed concurrent connections (for example, four connections) that is prescribed.

Figure 2:
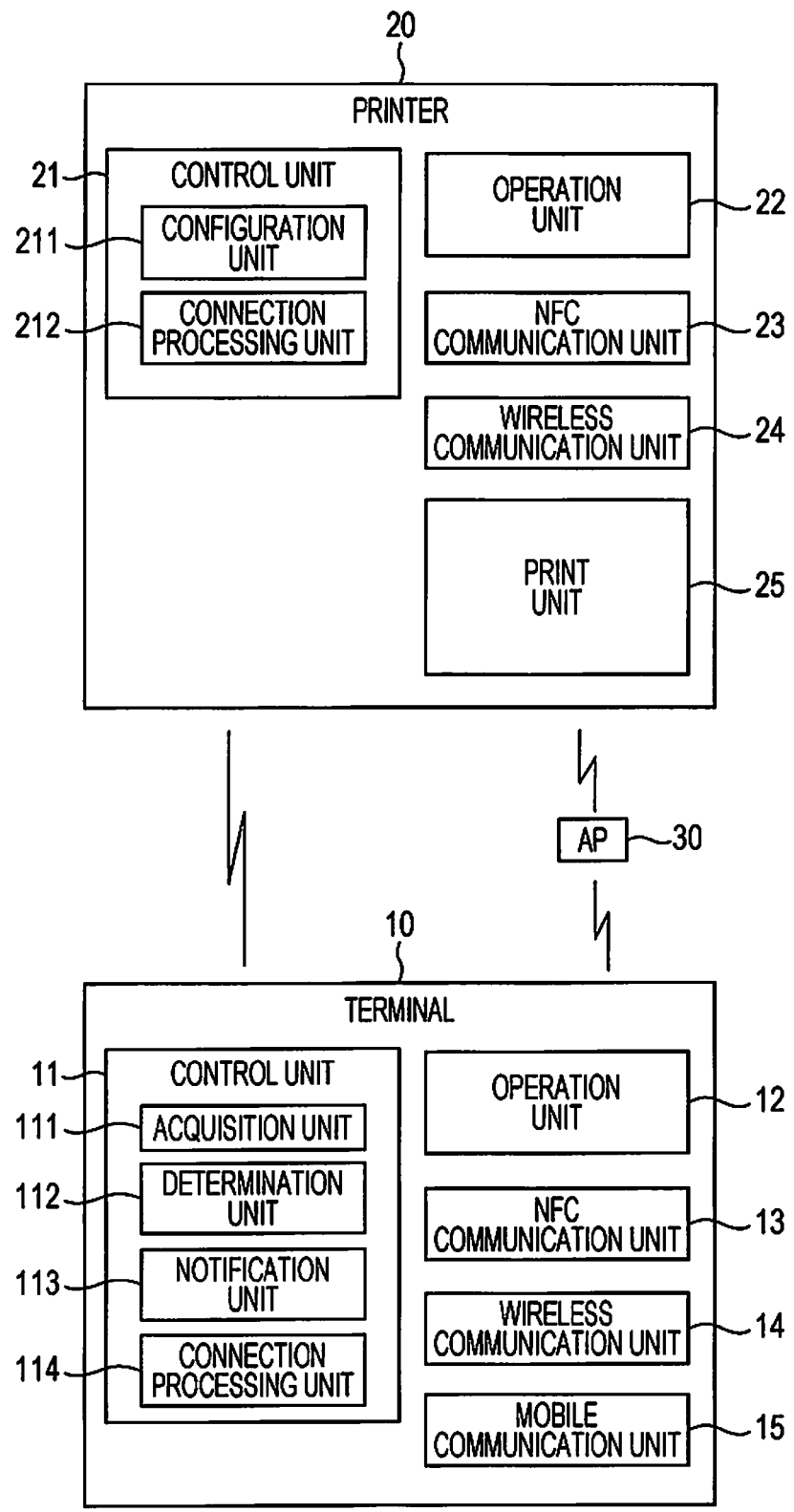
FIG. 2 is a block diagram illustrating the example of the constitution of the wireless communication system.

FIG. 2 is a block diagram illustrating the example of the constitution of the wireless communication system.

The terminal 10 includes a control unit 11, an operation unit 12, a Near Field Communication (NFC) communication unit 13 (which is equivalent to a "short-distance wireless communication unit" according to the invention), a wireless communication unit 14 (which is equivalent to a "wireless communication unit" according to the invention), and a mobile communication unit 15. The control unit 11 includes an acquisition unit 111, a determination unit 112, a notification unit 113, and a connection processing unit 114.

The control unit 11 controls operation of the terminal 10 in an integrated manner. The control unit 11, for example, can be realized by a computer that includes a Central Processing Unit (CPU), a Random Access Memory (RAM) that is a volatile storage device, a Read Only Memory (ROM) that is a non-volatile storage device, an interface (I/F) circuit that connects the control unit 11 and other units, a bus that connects these to one another, and the like. The computer may include various dedicated processing circuits, such as an image processing circuit. The control unit 11 may be realized as a programmable processing circuit, such as an Application Specific Integrated Circuit (ASIC) or an FPGA.

At least some of the functions of the control unit 11, for example, can be realized by the CPU reading a prescribed program stored in the ROM into the RAM for execution. The prescribed program, for example, is an application program that runs on an Operating System (OS), and can be read from a portable storage medium for installation on the terminal 10, or can be downloaded from a server on a network for the installation on the terminal 10. At least some of the functions of the control unit 11, for example, may be realized by a dedicated processing circuit. At least some of the functions of the control unit 11, for example, may be realized by both of the CPU and the dedicated processing circuit.

The operation unit 12 receives an operation input of a user, and outputs an operation signal in accordance with the operation to the control unit 11. Furthermore, the operation unit 12 displays a result of the processing by the control unit 11 as characters, a graph, a table, animation, and other images. The operation unit 12 can be realized as an input unit or an input device that includes, for example, keys, a touch sensor, and the like, and an output unit or an output device that is, for example, a Liquid Crystal Display (LCD), an Organic Electro-Luminescence Display (OLED), or the like.

The NFC communication unit 13 is a reader/writer (which is also referred to as an NFC reader/writer) that performs communication in compliance with NFC specifications. When the NFC communication unit 13 is brought into proximity with an NFC tag to which power is not supplied, power that results from electromagnetic induction is supplied to the NFD tag. Thus, the NFC tag can operate.

The NFC communication unit 13 includes, for example, an antenna, a memory (which is equivalent to a "storage device" according to the invention), and a logic circuit, and performs short-distance wireless communication. The antenna transmits and receives a signal in compliance with the NFC specifications. According to an instruction from the control unit 11, the logic circuit writes data to the memory or reads data from the memory. Furthermore, according to the instruction from the control unit 11, the logic circuit transmits and receives data to and from the NFC tag through the antenna. The logic circuit writes data to the NFC tag or reads data from the NFC tag (for example, this is referred to as an RF communication mode). Furthermore, through the NFC tag, the logic circuit can control bidirectional communication between a host apparatus that includes the NFC tag and the reader/writer (for example, this is referred to a tunnel mode). Because the NFC reader/writer and various communication modes therefor are realized using the existing technology, detailed descriptions thereof are omitted.

For example, through the NFC communication unit 13, the control unit 11 can write data to an NFC communication unit 23 or can read data from the NFC communication unit 23 (the RF communication mode).

The wireless communication unit 14 is a communication module into which a communication function in compliance with Wi-Fi specifications and Wi-Fi Direct specifications that are wireless LAN specifications is built. The control unit 11 can establish the Wi-Fi connection and the direct connection, which are described above, to an external apparatus through the wireless communication unit 14, and can communicate with the external apparatus. Because the Wi-Fi connection and the direct connection can be realized using the existing technology, detailed descriptions thereof are omitted.

The mobile communication unit 15 is a communication module that performs communication through a portable telephone line. The portable telephone line, for example, complies with communication specifications for 3G, 4G, and the like.

The acquisition unit 111 acquires connection type information relating to a connection type for the terminal 10. The acquisition unit 111, for example, reads connection type information from the storage unit, such as the RAM of the terminal 10, or from the wireless communication unit 14. Alternatively, the acquisition unit 111 detects an available connection type for the wireless communication unit 14. The connection type information is information relating to an available connection type that the wireless communication unit 14 provides currently. The available connection type in the terminal 10 is a connection type in which a communication connection is actually established between the terminal 10 and an external apparatus. A non-available connection type in the terminal 10 is a connection type in which a communication connection is not established between the terminal 10 and an external apparatus.

Connection type information on the terminal 10, for example, includes the following pieces of data.

Identifier of the connection type (which indicates "UNCONNECTED", "Wi-Fi" or "direct")

Identifier of the communication speed (which indicates "11ac", "11n", "11g", or "11b")

Identifier of the encryption scheme (which indicates "NO SECURITY", "WEP", "TKIP", or "AES")

Configuration information (an SSID and a password) for the Wi-Fi connection or the direct connection The acquisition unit 111 acquires connection type information relating to the connection type for the printer 20. The acquisition unit 111 reads connection type information from the NFC communication unit 23 of the printer 20 through the NFC communication unit 13. The connection type information is information relating to an available connection type that the wireless communication unit 24 provides currently. The available connection in the printer 20 is a connection type in which the communication connection is actually established between the printer 20 and an external apparatus, or is a connection type in which the establishment of the communication connection according to a connection request from the external apparatus can be prepared. A non-available connection in the printer 20 is a connection type in which the communication connection is not established between the printer 20 and an external apparatus, or is a connection type in which the establishment of the communication connection according to a connection request from the external apparatus is not prepared.

Connection type information on the printer 20, for example, includes the following pieces of data.

Identifier of the connection type (which indicates "UNCONNECTED", "Wi-Fi", "DIRECT", "Wi-Fi+DIRECT")

Identifier of the communication speed of the Wi-Fi connection (which indicates "11ac", "11n", "11g", or "11b")

Identifier of the encryption scheme for the Wi-Fi connection (which indicates "NO SECURITY", "WEP", "TKIP", or "AES")

Configuration information (an SSID and a password) for the Wi-Fi connection

Identifier of the communication speed of the direct connection (which indicates "11n")

Identifier of the encryption scheme for the direct connection (which indicates "TKIP")

Configuration information (an SSID and a password) for the direct connection

Available state of the direct connection (which indicates "AVAILABLE" or "UNAVAILABLE")

The determination unit 112 determines a recommendation connection type between the terminal 10 and the printer 20 based on a prescribed rule, using the connection type information on the terminal 10 and the connection type information on the printer 20, which are acquired by the acquisition unit 111, as inputs. In a case where the focus is placed upon the communication speed as an attribute item, the determination unit 112 determines the recommendation connection type based on a prescribed rule for the communication speed. In a case where the focus is placed upon the security as an attribute item, the determination unit 112 determines the recommendation connection type based on a prescribed rule for the security. Processing by the determination unit 112 will be described below.

The notification unit 113 notifies the user of information relating to the recommendation connection type that is determined by the determination unit 112. For example, the notification unit 113 displays on the operation unit 12 an operation screen including the information relating to the recommendation connection type. Processing by the notification unit 113 will be described below.

The connection processing unit 114 controls the wireless communication unit 14, and thus performs connection processing for communication in accordance with a designated connection type. For example, the connection processing unit 114 establishes a communication connection in accordance with the available connection type, using configuration information on the available connection type for the printer 20, which is acquired by the acquisition unit 111. Processing by the connection processing unit 114 will be described below.

The printer 20 includes a control unit 21, an operation unit 22, the NFC communication unit 23 (which is equivalent to the "short-distance wireless communication" according to the invention), a wireless communication unit 24 (which is equivalent to the "wireless communication unit" according to the invention), and a print unit 25. The control unit 21 includes a configuration unit 211 and a connection processing unit 212.

The control unit 21 controls operation of the printer 20 in an integrated manner. The control unit 21, for example, can be realized by a computer that includes a CPU, a RAM that is a volatile storage device, a ROM that is a non-volatile storage device, an interface circuit that connects the control unit 21 and other units, a bus that connects these to one another, and the like. The control unit 21 may include various processing circuits, such as an image processing circuit. The control unit 21 may be realized as an ASIC or the like.

At least some of the functions of the control unit 21, for example, can be realized by the CPU reading a prescribed program stored in the ROM into the RAM for execution. The prescribed program, for example, can be read from a portable storage medium for installation on the printer 20, or can be downloaded from a server on a network for the installation on the printer 20. At least some of the functions of the control unit 21, for example, may be realized by a dedicated processing circuit. At least some of the functions of the control unit 21, for example, may be realized by both of the CPU and the dedicated processing circuit.

The operation unit 22 receives an operation input of the user, and outputs an operation signal in accordance with the operation to the control unit 21. Furthermore, the operation unit 22 displays a result of the processing by the control unit 21 as characters, a graph, a table, animation, and other images. The operation unit 22 can be realized as an input unit or an input device that includes, for example, keys, a touch sensor, and the like, and an output unit or an output device that is, for example, an LCD, an OLED, or the like.

The NFC communication unit 23 is a communication tag (which is also referred to the NFC tag) that performs communication in compliance with the NFC specifications. Even in a case where power is not supplied from the printer 20, because power that results from the electromagnetic induction from the NFC reader/writer that is brought into proximity to the NFC communication unit 23 is supplied, the NFC communication unit 23 can operate.

The NFC communication unit 23 includes, for example, an antenna, a memory (which is equivalent to the "storage device" according to the invention), and a logic circuit, and performs the short-distance wireless communication. The antenna transmits and receives a signal in compliance with the NFC specifications. According to an instruction from the NFC reader/writer of an external apparatus (the terminal 10) through the antenna, the logic circuit writes data to the memory, or reads data from the memory for output (for example, this is referred to as the RF communication mode). According to an instruction from a host apparatus (the control unit 21), the logic circuit writes data to the memory, or reads data from the memory for output (for example, this is referred to as a serial communication mode). Furthermore, the logic circuit can control bidirectional communication between an external apparatus and a host apparatus (for example, this is referred to the tunnel mode). Because the NFC tag and various communication modes therefor are realized using the existing technology, detailed descriptions thereof are omitted.

The control unit 21 can write data to the NFC communication unit 23 or can read data from the NFC communication unit 23 (the serial communication mode).

The wireless communication unit 24 is a communication module into which the communication function in compliance with the Wi-Fi specifications and the Wi-Fi Direct specifications that are the wireless LAN specifications is built. The control unit 21 can establish the Wi-Fi connection and the direct connection, which are described above, to an external apparatus through the wireless communication unit 24, and can communicate with the external apparatus. Because the Wi-Fi connection and the direct connection can be realized using the existing technology, detailed descriptions thereof are omitted.

The print unit 25 forms an image according to an instruction from the control unit 21. The print unit 25, for example, is a print module that is an ink jet type, a laser type scheme, or the like, and is constituted from a machine component, a sensor, a motor, a drive circuit, a control circuit, and the like.

The configuration unit 211 writes the connection type information on the printer 20 to the NFC communication unit 23. For example, the configuration unit 211 detects the available connection type for the wireless communication unit 24, and writes the connection type information relating to the connection to the memory of the NFC communication unit 23 (the serial communication mode). Contents of the connection type information are described above.

The connection processing unit 212 controls the wireless communication unit 24, and, according to the connection request from an external apparatus, performs connection processing for the communication connection. For example, the connection processing unit 212 establishes the direct connection according to the connection request from the external apparatus as a virtual AP. Furthermore, the connection processing unit 212 performs the connection processing in accordance with the designated communication. For example, the connection processing unit 212 establishes the Wi-Fi connection to an AP 30, using the configuration information that is received from the terminal 10, or is received through the operation unit 12. Processing by the connection processing unit 212 will be described below.

A prescribed rule that is used for determining the recommendation connection type is described. The prescribed rule for the communication speed, for example, can be realized by a recommendation determination table 150 that is illustrated in FIGS. 3 and 4. The prescribed rule for the security, for example, can be realized by a recommendation determination table 160 that is illustrated in FIGS. 5 and 6. These recommendation determination tables, for example, are stored in the storage unit, such as the RAM of the terminal 10.

FIG. 3 is a diagram (a first one) illustrating one example of the recommendation determination table that is based on the communication speed. FIG. 4 is a diagram (a second one) illustrating one example of the recommendation determination table that is based on the communication speed. FIGS. 3 and 4 that result from division for convenience illustrate contents of the same recommendation determination table 150.

Each item 151 along the vertical direction of the recommendation determination table 150 indicates a currently available connection type for the terminal 10 and a communication speed thereof. Each item 152 along the horizontal direction of the recommendation determination table 150 indicates a currently available connection type for the printer 20 and a communication speed thereof. An item 153 that is positioned at an intersection point between the item 151 in the vertical direction and the item 152 in the horizontal direction indicates a recommendation connection type and a communication speed thereof.

Based on the connection type information on the terminal 10, which is acquired by the acquisition unit 111, the determination unit 112 selects one item 151. For example, in a case where the identifier of the connection type is "UNCONNECTED", the determination unit 112 selects the item 151 that indicates "UNCONNECTED". In a case where the identifier of the connection type is "DIRECT", the determination unit 112 selects the item 151 that indicates "DIRECT". In a case where the identifier of the connection type is "Wi-Fi", the determination unit 112 selects the item 151 that corresponds to the identifier ("11ac", "11n", "11g", or "11b") of the communication speed, from among the items 151 that indicate "Wi-Fi".

Furthermore, based on the connection type information on the printer 20, which is acquired by the acquisition unit 111, the determination unit 112 selects one item 152. For example, in the case where the identifier of the connection type is "UNCONNECTED", the determination unit 112 selects the item 152 that indicates "UNCONNECTED". In a case where the identifier of the connection type is "DIRECT", the determination unit 112 selects the item 152 that corresponds to the available state ("AVAILABLE" or "UNAVAILABLE") of the direct connection, from among the items 152 that indicate "DIRECT". In the case where the identifier of the connection type is "Wi-Fi", the determination unit 112 selects the item 152 that corresponds to the identifier ("11ac", "11n", "11g", or "11b") of the communication speed of the Wi-Fi connection, from among the items 152 that indicate "Wi-Fi". In a case where the identifier of the connection type is "Wi-Fi+DIRECT", the determination unit 112 selects the item 152 that corresponds to a combination of the identifier of the communication speed of the Wi-Fi connection and the available state of the direct connection, from among the items 152 that indicate "Wi-Fi+DIRECT".

Furthermore, the determination unit 112 extracts an item 153 that is positioned at the intersection point between the item 151 and item 152, which are selected as described above, and thus determines the recommendation connection type and the communication speed thereof.

A policy for the determination rule is basically to recommend one of the connection types for the terminal 10 and the printer 20 that has a higher communication speed (communication speed and performance in the specification) than the other. However, in a case where the communication speed of the connection type is recommended is the same as or lower than the communication speed (communication speed and performance in the specification) of the direct connection, the direct connection is maintained. Furthermore, in a case where the direct connection is not available for concurrent connection, the connection type that has the higher communication speed is recommended. "UNCONNECTED" is regarded as the connection type that has the lowest communication speed. For example, in a case where the communication speed of the Wi-Fi connection is the same as or lower than the communication speed of the direct connection, the direct is recommended. This is because the Wi-Fi connection through the AP 30 is likely to cause congestion due to many apparatuses and has a lower communication speed than the direct connection.

FIG. 5 is a diagram (a first one) illustrating one example of a recommendation determination table that is based on the security. FIG. 6 is a diagram (a second one) illustrating one example of the recommendation determination table that is based on the security. FIGS. 5 and 6 that result from division for convenience illustrate contents of the same recommendation determination table 160.

Each item 161 along the vertical direction of the recommendation determination table 160 indicates the currently available connection type for the terminal 10 and an encryption scheme thereof. Each item 162 along the horizontal direction of the recommendation determination table 160 indicates the currently available connection type for the printer 20 and an encryption scheme thereof. An item 163 that is positioned at an intersection point between the item 161 in the vertical direction and the item 162 in the horizontal direction indicates a recommendation connection type and an encryption scheme thereof.

Based on the connection type information on the terminal 10, which is acquired by the acquisition unit 111, the determination unit 112 selects one item 161. For example, in the case where the identifier of the connection type is "UNCONNECTED", the determination unit 112 selects the item 161 that indicates "UNCONNECTED". In the case where the identifier of the connection type is "DIRECT", the determination unit 112 selects the item 161 that indicates "DIRECT". In the case where the identifier of the connection type is "Wi-Fi", the determination unit 112 selects the item 161 that corresponds to the identifier ("NO SECURITY", "WEP", "TKIP", or "AES") of the encryption scheme, from among the items 161 that indicate "Wi-Fi".

Furthermore, based on the connection type information on the printer 20, which is acquired by the acquisition unit 111, the determination unit 112 selects one item 162. For example, in the case where the identifier of the connection type is "UNCONNECTED", the determination unit 112 selects the item 162 that indicates "UNCONNECTED". In the case where the identifier of the connection type is "DIRECT", the determination unit 112 selects the item 162 that corresponds to the available state ("AVAILABLE" or "UNAVAILABLE") of the direct connection, from among the items 162 that indicate "DIRECT". In the case where the identifier of the connection type is "Wi-Fi", the determination unit 112 selects the item 162 that corresponds to the identifier ("NO SECURITY", "WEP", "TKIP", or "AES") of the encryption scheme for the Wi-Fi connection, from among the items 162 that indicate "Wi-Fi". In the case where the identifier of the connection type is "Wi-Fi+DIRECT", the determination unit 112 selects the item 162 that corresponds to a combination of the identifier of the encryption scheme for the Wi-Fi connection and the available state of the direct connection, from among the items 162 that indicate "Wi-Fi+DIRECT".

Furthermore, the determination unit 112 extracts an item 163 that is positioned at the intersection point between the item 161 and item 162, which are selected as described above, and thus determines the recommendation connection type and the encryption scheme thereof.

A policy for the determination rule is basically to recommend the higher of the security (security and performance in the specification) ensured by the encryption scheme for the terminal 10 and the security (security and performance in the specification) of the encryption scheme for the printer 20. However, in a case where the higher security that is recommended is the same as or lower than the security (communication speed and performance in the specification) of the direct connection, the direct connection is maintained. Furthermore, in the case where the direct connection is not available for concurrent connection, the connection type that ensures the higher security is recommended. The connection type with "NO SECURITY" is configured not to be recommended. For example, in a case where the security of the Wi-Fi connection is the same as or lower than the security of the direct connection, the direct is recommended. This because, in the case of the Wi-Fi connection through the AP 30, there are many relay steps on a communication path when compared with the case of the direct connection and this increases the likelihood of communication benign intercepted.

Operation of each of the terminal 10 and the printer 20 is described.

FIG. 7 is a flowchart illustrating one example of recommendation determination processing by the terminal. Processing in the present flowchart, for example, starts in a case where a prescribed application program is activated on the terminal 10.

The terminal 10 acquires the connection type information on the printer 20 through NFC (Step S10). For example, the user causes the NFC communication unit 23 of the printer 20 to face the NFC communication unit 13 of the terminal 10.

The acquisition unit 111 reads the connection type information from the NFC communication unit 23 of the printer 20 through the NFC communication unit 13. Furthermore, the acquisition unit 111 acquires the connection type information on the terminal 10 (Step S20). For example, the acquisition unit 111 reads the connection type information from the storage unit, such as the RAM of the terminal 10.

Thereafter, the terminal 10 receives a connection condition from the user (Step S30). The connection condition is a condition for selecting the recommendation connection type, and according to the present embodiment, is the "communication speed" and the "security". The acquisition unit 111, for example, displays an operation screen 500 as illustrated in FIG. 8 (a figure that illustrates one example of the operation screen) on the operation unit 12. The operation screen 500 displays choices 501 (the communication speed and the security) for the connection condition. Furthermore, the operation screen 500 includes an OK button 505 for proceeding with the processing, and a cancellation button 506 for ending the processing. In a case where an operation that is performed on the OK button 505 is received through the operation unit 12, the acquisition unit 111 acquires a connection condition that is selected from among the choices 501. In a case where an operation that is performed on the cancellation button 506 is received through the operation unit 12, the acquisition unit 111, for example, ends the processing in the present flowchart.

That is, the terminal 10 determines the recommendation connection type (Step S40). For example, the determination unit 112 selects the recommendation determination table (the recommendation determination table 150 or the recommendation determination table 160) that corresponds to the connection condition (the communication speed or the security) that is acquired in Step S30, as a table for a reference destination. Furthermore, based on the connection type information on the terminal 10, which is acquired in Step S20, and the connection type information on the printer 20, which is acquired in Step S10, the determination unit 112 determines the recommendation determination table (and the communication or the encryption scheme) from the selected recommendation determination table.

When it comes to determination of the recommendation connection type, the determination unit 112 determines the recommendation connection type is "DIRECT" or "ABSENT". In a case where the recommendation connection type is "DIRECT" (Step S40 (3)), the determination unit 112 causes the processing to proceed to Step S70. In a case where the recommendation connection type is "ABSENT" (Step S40 (4)), the determination unit 112 causes the processing to proceed to Step S80.

In a case where the recommendation connection type is neither "DIRECT", nor "ABSENT", the determination unit 112 compares the connection type (and the communication speed or the encryption scheme) for the terminal 10 and the recommendation connection type (and the communication speed or the encryption scheme) with each other. In a case where these are consistent with each other (Step S40 (1)), the determination unit 112 causes the proceed to Step S50.

In a cases where the connection type (and the communication speed or the encryption scheme) for the terminal 10 and the recommendation connection type (and the communication speed or the encryption scheme) are not consistent with each other, the determination unit 112 compares the connection type (and the communication speed or the encryption scheme) for the printer 20 and the recommendation connection type (and the communication speed or the encryption scheme) with each other. In a case where these are consistent with each other (Step S40 (2)), the determination unit 112 causes the proceed to Step S60.

In the case of (1) in Step S40, the terminal 10 recommends the connection type (Wi-Fi) for the terminal 10 (Step S50). For example, the notification unit 113 notifies the user that the use of the recommendation connection type (the Wi-Fi connection to the terminal 10) that is determined in Step S40 is recommended for the communication between the terminal 10 and the printer 20.

Figure 9:
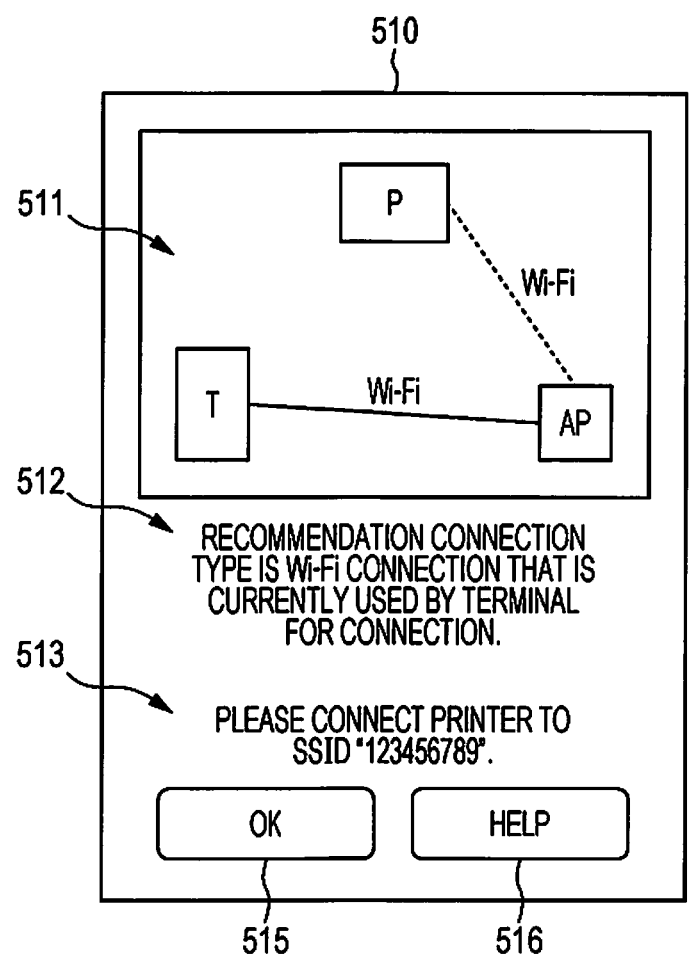
FIG. 9 is a diagram illustrating another example of the operation screen.

The notification unit 113, for example, displays an operation screen 510 as illustrated in FIG. 9 (a figure that illustrates another example of the operation screen) on the operation unit 12. The operation screen 510 includes a connection image 511, a recommendation message 512, an auxiliary message 513, an OK button 515, and a help button 516. The connection image 511 include objects that indicate a terminal, a printer, and an AP, respectively, an object that indicates the currently available connection type (the Wi-Fi connection to the AP) for the terminal 10, and an object that indicates the recommendation connection type (the Wi-Fi connection to the AP) for the printer 20. The recommendation message 512 illustrates that the currently available connection type for the terminal 10 is recommended. The auxiliary message 513 indicates the configuration information (the SSID, the password, the encryption scheme, or the like) on the currently available connection type for the terminal 10. The OK button 515 is a button for ending the processing. The help button 516 is a button for displaying help information, such as a configuration procedure for connecting the Wi-Fi connection to the printer 20.

In a case where an operation that is performed on the OK button 515 is received through the operation unit 12, the notification unit 113 ends the processing in the present flowchart. In a case where an operation that is performed on the help button 516 is received through the operation unit 12, the notification unit 113 displays the configuration procedure and the like for making the Wi-Fin connection to the printer 20.

Moreover, for example, the user may configure the Wi-Fi connection to the printer 20, referring to the configuration information (the SSID, the password, or the like) for the Wi-Fi connection, which is displayed on the operation screen 510. The connection processing unit 212 of the printer 20 can establish the Wi-Fi connection to the AP 30 using the configuration information for the configured recommendation Wi-Fi connection. Accordingly, the terminal 10 can communicate with the printer 20 through the AP 30 using the Wi-Fi connection while maintaining a currently available connection configuration.

In the case of (2) in Step S40, the terminal 10 recommends the connection type (Wi-Fi) for the printer 20 (Step S60). For example, the notification unit 113 notifies the user that the use of the recommendation connection type (the Wi-Fi connection to the printer 20) that is determined in Step S40 is recommended for the communication between the terminal 10 and the printer 20.

Figure 10:
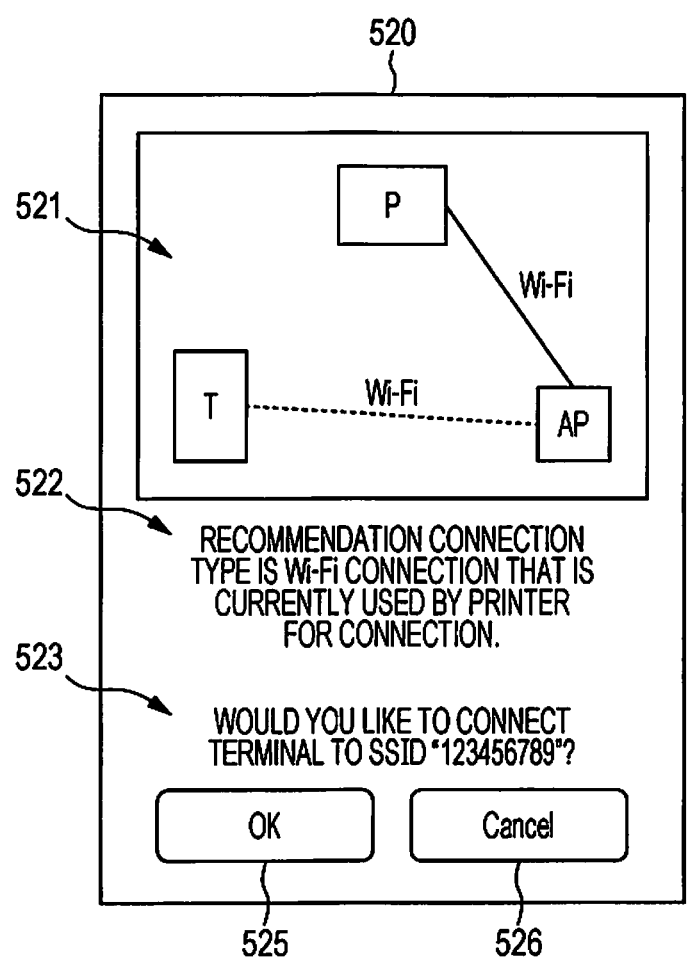
FIG. 10 is a diagram illustrating still another example of the operation screen.

The notification unit 113, for example, displays the operation screen 520 as illustrated in FIG. 10 (a figure that illustrates another example of the operation screen) on the operation unit 12. The operation screen 520 includes a connection image 521, a recommendation message 522, an auxiliary message 523, an OK button 525, and a cancellation button 526. The connection image 521 include objects that indicate a terminal, a printer, and an AP, respective, an object that indicates the currently available connection type (the Wi-Fi connection to the AP) for the printer 20, and an object that indicates the recommendation connection type (the Wi-Fi connection to the AP) for the terminal 10. The recommendation message 522 illustrates that the currently available connection type for the printer 20 is recommended. The auxiliary message 523 indicates the configuration information (the SSID, the password, the encryption scheme, or the like) on the currently available connection type for the printer 20. The OK button 525 is a button for making the Wi-Fi connection to the terminal 10. The cancellation button 526 is a button for ending the processing.

In a case where the notification unit 113 receives through the operation unit 12 an operation that is performed on the OK button 525, the connection processing unit 114 establishes the Wi-Fi connection between the wireless communication unit 14 and the AP 30 using the configuration information (the SSID, the password, the encryption scheme, or the like) for the available Wi-Fi connection to the printer 20, which is acquired in Step S10, and ends the processing in the present flowchart. In this manner, the terminal 10 can communicate with the printer 20 through the AP 30 using the Wi-Fi connection. A current connection type for the printer 20 is maintained. In a case where an operation that is performed on the cancellation button 526 is received through the operation unit 12, the notification unit 113 ends the processing in the present flowchart.

In the case of (3) in Step S40, the terminal 10 recommends the connection type (direct) for the printer 20 (Step S70). For example, the notification unit 113 notifies the user that the use of the recommendation connection type (the direct connection to the printer 20) that is determined in Step S40 is recommended for the communication between the terminal 10 and the printer 20.

Figure 11:
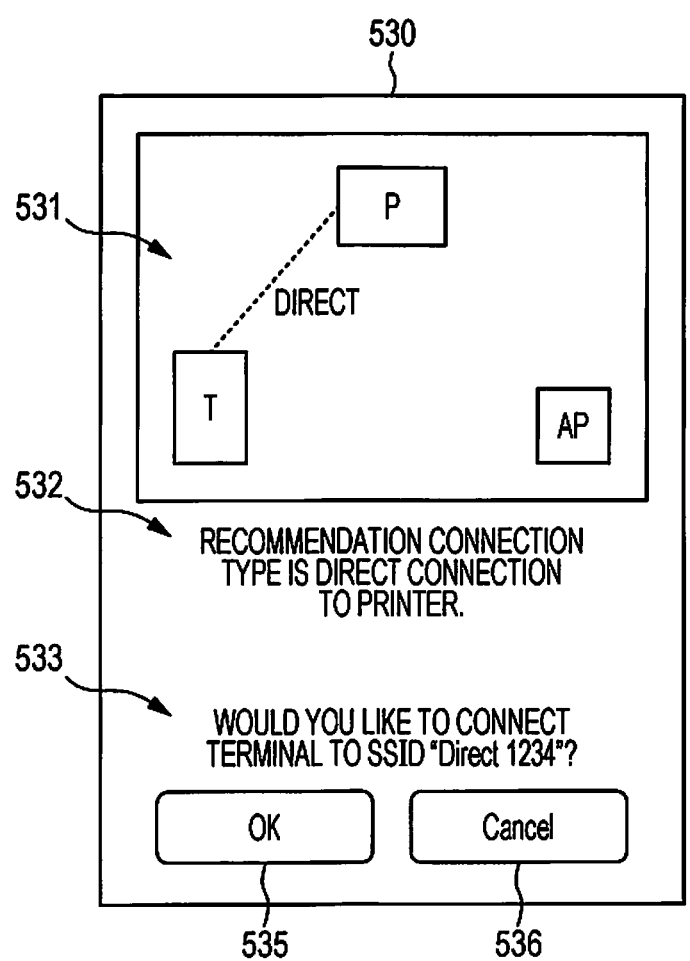
FIG. 11 is a diagram illustrating still another example of the operation screen.

The notification unit 113, for example, displays the operation screen 530 as illustrated in FIG. 11 (a figure that illustrates another example of the operation screen) on the operation unit 12. The operation screen 530 includes a connection image 531, a recommendation message 532, an auxiliary message 533, an OK button 535, and a cancellation button 536. The connection images 531 include objects that indicates a terminal, a printer, and an AP, respectively, and an object that indicates the recommendation connection type (the direct connection to the printer) for the terminal 10. The recommendation message 532 indicates that the direct connection (regardless of whether the direct connection is available or unavailable) to the printer 20 is recommended. The auxiliary message 533 indicates the configuration information (the SSID, the password, the encryption scheme, or the like) for the direct connection to the printer 20. The OK button 535 is a button for making the direct connection to the terminal 10. The cancellation button 536 is a button for ending the processing.

In a case where the notification unit 113 receives through the operation unit 12 an operation that is performed on the OK button 535, the connection processing unit 114 establishes the direct connection between the wireless communication unit 14 and the printer 20 using the configuration information (the SSID, the password, the encryption scheme, or the like) for the direct connection to the printer 20, which is acquired in Step S10, and ends the processing in the present flowchart. In this manner, the terminal 10 can communicate with the printer 20 using the direct connection. In a case where an operation that is performed on the cancellation button 536 is received through the operation unit 12, the notification unit 113 ends the processing in the present flowchart.

Based on the connection type information on the printer 20 that is acquired in Step S10, the notification unit 113 determines whether or not the direct connection to the printer 20 is available. In a case where the direct connection is unavailable, the notification unit 113 may display a message indicating the need for the direct connection to be available, on the operation screen 530.

Moreover, for example, in a case where the direct connection to the printer 20 is unavailable, the user may enable the direct connection to be available by operating the printer 20. With this operation, the connection processing unit 212 of the printer 20 is caused to enable the direct connection to be available. In a case where the terminal 10 makes an attempt at the direct connection between the terminal 10 and the printer 20, the connection processing unit 212 establishes the direct connection between the wireless communication unit 24 and the terminal 10. Accordingly, the terminal 10 can communicate with the printer 20 using the direct connection.

In the case of (4) in Step S40, the terminal 10 provides guidance for a handling method (Step S80). For example, the notification unit 113 notifies the user that the recommendation connection type is not found.

Figure 12:
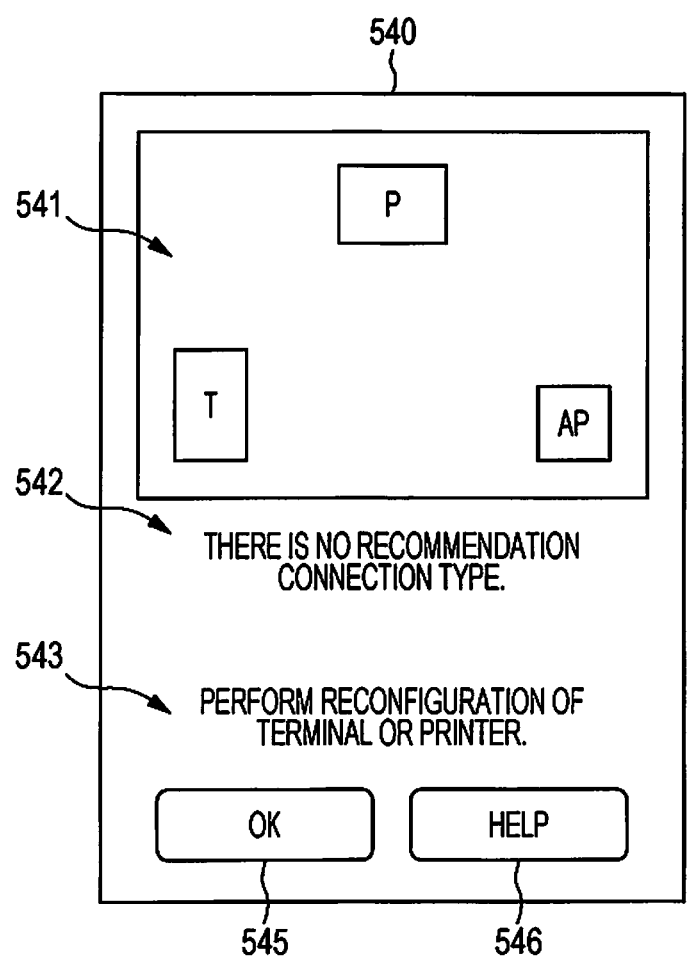
FIG. 12 is a diagram illustrating still another example of the operation screen.

The notification unit 113, for example, displays the operation screen 540 as illustrated in FIG. 12 (a figure that illustrates another example of the operation screen) on the operation unit 12. The operation screen 540 includes a connection image 541, a recommendation message 542, an auxiliary message 543, an OK button 545, and a help button 546. The connection images 541 include objects that indicates a terminal, a printer, and an AP, respectively. The connection images 541 may include the currently available connection type for the terminal 10 (the Wi-Fi connection to the AP or the direct connection to the AP). The recommendation message 542 indicates that the connection type which is recommended is not found. The auxiliary message 543 indicates that configurations of the terminal 10 and the printer 20 are reconsidered. The OK button 545 is a button for ending the processing. The help button 546 is a button for displaying the help information, such as the configuration procedure, for enabling the Wi-Fi connection or the direct connection to the terminal 10 and the printer 20 to be available.

In a case where an operation that is performed on the OK button 545 is received through the operation unit 12, the notification unit 113 ends the processing in the present flowchart. In a case where the notification unit 113 receives through the operation unit 12 an operation that is performed on the help button 546, for example, the notification unit 113 displays the configuration procedure for enabling the Wi-Fi connection or the direct connection to the terminal 10 and the printer 20 to be available.

Moreover, for example, the user may reconsider the configuration of the terminal 10 or the printer 20, referring to the information that is displayed on the operation screen 540. Thereafter, the user may cause the terminal 10 to perform the processing in the present flowchart by causing the terminal 10 to face the printer 20 again.

One embodiment of the invention is described above. In the wireless communication system according to the present embodiment, when the user causes the terminal to face the printer, the terminal determines the recommendation connection type based on a current connection type information on the terminal and a current connection type information on the printer, notifies the user of the recommendation connection type, and notifies the user of information for making a communication connection using the recommendation connection type. Accordingly, the user can simply select a suitable connection type.

In a case where the recommendation connection type is the Wi-Fi connection to the printer or the direct connection to the printer, the terminal establishes the communication connection using the configuration information on the connection type for the printer, which is read. Accordingly, the user can simply establish the communication connection using a suitable connection type. In a case where the recommendation connection type is the Wi-Fi connection to the terminal, the terminal maintains a current connection type, and notifies the user of the configuration information for the recommendation connection type. Accordingly, the user configures the configuration information on the printer, and thus the user can simply establish the communication connection using a suitable connection type.

The invention is not limited to the embodiments described above, and it is possible that the invention is implemented into various embodiments within the scope that does not depart from the gist of the invention. For example, the following modifications to the embodiments may be made. Furthermore, two or more of the embodiments and two or more modification examples may be suitably combined.

According to the embodiment, an RF communication mode and a serial communication mode are used for reading and writing of the connection type information on the printer 20, but an NFC tunnel mode may be used. For example, the control unit 11 communicates with the control unit 21 through the NFC communication unit 13 and the NFC communication unit 23. The acquisition unit 111 transmits a request for the connection type information to the configuration unit 211. In a case where the request is received from the acquisition unit 111, the configuration unit 211 responds with the connection type information.

In Step S50, the notification unit 113 may transmit the configuration information (the SSID, the password, the encryption scheme, or the like) on the currently available connection type for the terminal 10 to the configuration unit 211, for example, using the NFC tunnel mode. In this case, the connection processing unit 212 establishes the Wi-Fi connection between the wireless communication unit 24 and the AP 30, using the configuration information for the available Wi-Fi connection for the terminal 10, which is received by the configuration unit 211. Accordingly, the terminal 10 can communicate with the printer 20 through the AP 30 using the Wi-Fi connection while maintaining a currently available connection configuration.

The items 151 in the recommendation determination table 150 are not limited to the connection type that is supported by the terminal 10, and may include as many connection types as can be supported by various models of terminal. The items 152 in the recommendation determination table 150 are not limited to the connection type that is supported by the printer 20, and may include as many connection types as can be supported by various models of printer. Each item 153 may be configured in advance according to a combination of the item 151 and the item 152. In the recommendation determination table 160, in the same manner as in the recommendation determination table 150, as many connections as can be supported various model of terminal and printer may be included as well. As another connection type, for example, the direct connection (a Wi-Fi Direct mode) is considered. Additionally, as another connection type, for example, the Wi-Fi connection (IEEE 802.11a) is considered. The direct connections may be distinguished by the communication speeds (IEEE 802.11a, b, g, n, ac, and the like). The direct connections may be distinguished by the encryption schemes (NO SECURITY, WEP, TKIP, AES, and like).

According to the embodiment, the recommendation determination processing is performed by the terminal 10, but may be performed by the printer 20. That is, configurations of the terminal 10 and the printer 20, which are associated with the recommendation determination processing, may be substituted for each other.

For easy understanding, constitutions of the wireless communication system that is described above according to the embodiment are categorized according to main contents of the processing. The method and the name that are used for classification of the constituent elements does not impose any limitation on the invention. In the constituent of the wireless communication system, classification into more constituent elements is possible according to the contents of the processing. Furthermore, one constituent element may be classified in such a manner to perform more processing operations. Furthermore, processing by each constituent element may be performed with one piece of hardware item, and may be performed with multiple pieces of hardware. Furthermore, no sharing of the processing or function of each constituent element that can accomplish the purpose and effect of the invention is limited to what is described above. For example, at least a function of one portion of the terminal 10 may be built into the printer 20 and at least a function of one portion of the printer 20 may be built into the terminal 10. For example, the NFC tag may be mounted into the terminal 10, and the NFC reader/writer may be mounted into the printer 20.

Units for the processing in the flowchart that is described above are divided according to the main contents of the processing in order to provide easy understanding of processing by the wireless communication system. The in the present application is not limited by the method and the name of the division that uses the units for the processing. The processing operation by the wireless communication system is divided into many units for the processing according to the contents of the processing. Furthermore, one processing unit may be divided in such a manner to include more processing operations. Additionally, the processing order in the flowchart is also not limited to an example that is illustrated.

The screen or data structure that is described according to the embodiment is one example. No screen or data structure that can accomplish the object of the invention is limited to the example that is illustrated.

The electronic apparatus according to the invention is not limited to the terminal or the printer. The electronic apparatuses can include apparatuses, such as a PC, a wearable computer, a scanner, a multifunction machine, a projector, and a television, that are equipped with the short-distance wireless communication and the wireless LAN communication. Furthermore, the invention is not limited to the NFC, and may use other specifications as the short-distance wireless communication.

What is claimed is:

1. An electronic apparatus comprising:
a short-distance wireless communication unit;
a wireless communication unit that performs wireless communication for multiple different connection types; and
a control unit that acquires first connection type information relating to a connection type for an external apparatus, from the external apparatus through the short-distance wireless communication unit, and second connection type information relating to a connection type for the wireless communication unit, that automatically determines a recommendation connection type that is used for the communication between the external apparatus and the wireless communication unit, based on the first connection type information and the second connection type information, and that notifies a user of the recommendation connection type by automatically displaying an image including a first object indicative of the electronic apparatus, a second object indicative of the external apparatus, a third object indicative of the recommendation connection type, and a fourth object indicative of a currently active connection type such that the third object and the fourth object are distinguishable with respect to each other and are different from a check-box in response to automatically determining the recommendation connection type.

2. The electronic apparatus according to claim 1, wherein the first connection type information includes information relating to a currently available connection type for the external apparatus, and
wherein the second connection type information includes information relating to a currently available connection type for the wireless communication unit.

3. The electronic apparatus according to claim 2, wherein the control unit determines, as the recommendation connection type, one connection type of the currently available connection type for the external apparatus and the currently available connection type for the wireless communication unit that has higher performance in a prescribed attribute item than the other connection type of the currently available connection type for the external apparatus and the currently available connection type for the wireless communication unit while the one connection type has higher performance in the prescribed attribute item than a predetermined connection type that is different from the currently available connection type for the external apparatus and the currently available connection type for the wireless communication unit, and
wherein the control unit determines, as the recommendation connection type, the predetermined connection type while the one connection type has the same or lower performance in the prescribed attribute item than the predetermined connection type.

4. The electronic apparatus according to claim 1, wherein the control unit determines one of the connection type for the external apparatus and the connection type for the wireless communication unit that has higher performance in a prescribed attribute item than the other one of the connection type for the external apparatus and the connection type for the wireless communication unit, as the recommendation connection type.

5. The electronic apparatus according to claim 4, wherein the first connection type information includes pieces of information relating to a first connection type and a second connection type that are provided by the external apparatus,
wherein the control unit selects one that has higher performance in the prescribed item, from among the first connection type and the connection type for the wireless communication unit,
wherein, in a case where performance in the attribute item for the high-performance connection type is the same as or lower than performance in the attribute item for the second connection type, the control unit determines the second connection type as the recommendation connection type, and wherein, in a case where the performance in the attribute item for the high-performance connection type is higher than the performance in the attribute item for the second connection type, the control unit determines the selected connection type as the recommendation connection type.

6. The electronic apparatus according to claim 5, wherein the first connection type information includes information indicating whether or not the second connection type is available for communication connection, and
wherein, in a case where the performance in the attribute item for the high-performance connection type is the same as or lower than the performance in the attribute item for the second connection type, the control unit determines the second connection type as the recommendation connection type when the second connection type is available for the communication connection, and determines the selected connection type as the recommendation connection type when the second connection type is not available for the communication connection.

7. The electronic apparatus according to claim 5, wherein the first connection type is a connection type that performs communication through an access point, and
wherein the second connection type is a connection that performs the communication in a peer-to-peer manner, and
wherein the connection type for the wireless communication unit is the connection type that performs the communication through the access point or is the connection type that performs the communication in a peer-to-peer manner.

8. The electronic apparatus according to claim 4, wherein the prescribed attribute item is communication speed or security, and
wherein the control unit acquires a user selection of the attribute item between the communication speed and the security, and determines one of the connection type for the external apparatus and the connection type for the wireless communication unit that has higher performance in the selected attributed item than the other one of the connection type for the external apparatus and the connection type for the wireless communication unit, as the recommendation connection type.

9. The electronic apparatus according to claim 4, wherein the first connection type information includes configuration information on the connection type for the external apparatus, and
wherein, in a case where the connection type for the external apparatus is determined as the recommendation connection type, the electronic apparatus performs connection processing for communication with the external apparatus using the determined connection type, based on the configuration information.

10. The electronic apparatus according to claim 4, wherein the first connection type information includes configuration information on the connection type for the external apparatus, and
wherein, in a case where the connection type for the external apparatus is determined as the recommendation connection type, the control unit outputs the configuration information.

11. The electronic apparatus according to claim 4, wherein the second connection type information includes configuration information on the connection type for the wireless communication unit, and wherein, in a case where the connection type for the wireless communication unit is determined as the recommendation connection type, the control unit outputs the configuration information.

12. The electronic apparatus according to claim 1, wherein the image further includes a fifth object indicative of an access point.

13. A wireless communication method for use in an electronic apparatus including a short-distance wireless communication unit and a wireless communication unit that performs wireless communication for multiple different connection types, the method comprising:
acquiring a first connection type information relating to a connection type for an external apparatus, from the external apparatus through the short-distance wireless communication unit, and a second connection type information relating to a connection type for the wireless communication unit;
automatically determining a recommendation connection type that is used for the communication between the external apparatus and the wireless communication unit, based on the first connection type information and the second connection type information; and
notifying a user of the recommendation connection type by automatically displaying an image including a first object indicative of the electronic apparatus, a second object indicative of the external apparatus, a third object indicative of the recommendation connection type, and a fourth object indicative of a currently active connection type such that the third object and the fourth object are distinguishable with respect to each other and are different from a check-box in response to automatically determining the recommendation connection type.

14. A non-transitory computer-readable recording medium on which a program that runs on an electronic apparatus including a short-distance wireless communication unit and a wireless communication unit that performs wireless communication for multiple different connection types is recorded, the program causing the electronic apparatus to perform:
acquiring a first connection type information relating to a connection type for an external apparatus, from the external apparatus through the short-distance wireless communication unit, and a second connection type information relating to a connection type for the wireless communication unit;
automatically determining a recommendation connection type that is used for the communication between the external apparatus and the wireless communication unit, based on the first connection type information and the second connection type information; and
notifying a user of the recommendation connection type by automatically displaying an image including a first object indicative of the electronic apparatus, a second object indicative of the external apparatus, a third object indicative of the recommendation connection type, and a fourth object indicative of a currently active connection type such that the third object and the fourth object are distinguishable with respect to each other and are different from a check-box in response to automatically determining the recommendation connection type.

15. An electronic apparatus comprising:
a communication unit;
a wireless communication unit that performs wireless communication for multiple different connection types; and
a control unit that acquires first connection type information relating to a connection type for an external apparatus, from the external apparatus through the communication unit, and second connection type information relating to a connection type for the wireless communication unit, that automatically determines a connection type for the communication between the external apparatus and the wireless communication unit, based on the first connection type information and the second connection type information, and that notifies a user of the determined connection type by automatically displaying an image including a first object indicative of the determined connection type, and a second object indicative of a currently active connection type such that the first object and the second object are distinguishable with respect to each other and are different from a check-box in response to automatically determining the connection type.

16. The electronic apparatus according to claim 15, wherein the first connection type information includes information relating to a currently available connection type for the external apparatus, and
wherein the second connection type information includes information relating to a currently available connection type for the wireless communication unit.

17. The electronic apparatus according to claim 15, wherein the control unit determines one of the connection type for the external apparatus and the connection type for the wireless communication unit that has higher performance in a prescribed attribute item than the other one of the connection type for the external apparatus and the connection type for the wireless communication unit, as a recommendation connection type.

18. The electronic apparatus according to claim 17, wherein the first connection type information includes pieces of information relating to a first connection type and a second connection type that are provided by the external apparatus,
wherein the control unit selects one that has higher performance in the prescribed item, from among the first connection type and the connection type for the wireless communication unit,
wherein, in a case where performance in the attribute item for the high-performance connection type is the same as or lower than performance in the attribute item for the second connection type, the control unit determines the second connection type as the recommendation connection type, and
wherein, in a case where the performance in the attribute item for the high-performance connection type is higher than the performance in the attribute item for the second connection type, the control unit determines the selected connection type as the recommendation connection type.

19. The electronic apparatus according to claim 18, wherein the first connection type information includes information indicating whether or not the second connection type is available for communication connection, and
wherein, in a case where the performance in the attribute item for the high-performance connection type is the same as or lower than the performance in the attribute item for the second connection type, the control unit determines the second connection type as the recommendation connection type when the second connection type is available for the communication connection, and determines the selected connection type as the recommendation connection type when the second connection type is not available for the communication connection.

20. The electronic apparatus according to claim 18,
wherein the first connection type is a connection type that performs communication through an access point, and
wherein the second connection type is a connection that performs the communication in a peer-to-peer manner, and
wherein the connection type for the wireless communication unit is the connection type that performs the communication through the access point or is the connection type that performs the communication in a peer-to-peer manner.

21. The electronic apparatus according to claim 17,
wherein the prescribed attribute item is communication speed or security, and
wherein the control unit acquires a user selection of the attribute item between the communication speed and the security, and determines one of the connection type for the external apparatus and the connection type for the wireless communication unit that has higher performance in the selected attributed item than the other one of the connection type for the external apparatus and the connection type for the wireless communication unit, as the recommendation connection type.

22. The electronic apparatus according to claim 17,
wherein the first connection type information includes configuration information on the connection type for the external apparatus, and
wherein, in a case where the connection type for the external apparatus is determined as the recommendation connection type, the electronic apparatus performs connection processing for communication with the external apparatus using the determined connection type, based on the configuration information.

23. The electronic apparatus according to claim 17,
wherein the first connection type information includes configuration information on the connection type for the external apparatus, and
wherein, in a case where the connection type for the external apparatus is determined as the recommendation connection type, the control unit outputs the configuration information.

24. The electronic apparatus according to claim 17,
wherein the second connection type information includes configuration information on the connection type for the wireless communication unit, and
wherein, in a case where the connection type for the wireless communication unit is determined as the recommendation connection type, the control unit outputs the configuration information.

25. The electronic apparatus according to claim 15,
wherein the external apparatus is a printer.

* * * * *